United States Patent
Rohde

(10) Patent No.: US 7,264,232 B2
(45) Date of Patent: Sep. 4, 2007

(54) DEVICE FOR FOAMING A LIQUID

(75) Inventor: Florian Rohde, Minden (DE)

(73) Assignee: Melitta Haushaltsprodukte GmbH & Co. KG, Minden (DE)

( * ) Notice: Subject to any disclaimer, the term of this patent is extended or adjusted under 35 U.S.C. 154(b) by 113 days.

(21) Appl. No.: 11/132,330

(22) Filed: May 19, 2005

(65) Prior Publication Data

US 2005/0259508 A1    Nov. 24, 2005

(30) Foreign Application Priority Data

May 19, 2004   (DE)   ....................... 10 2004 024 721

(51) Int. Cl.
*B01F 3/04* (2006.01)

(52) U.S. Cl. .................. 261/91; 261/93; 261/DIG. 26; 366/102

(58) Field of Classification Search .................. 261/28, 261/30, 64.1, 87, 91, 93, DIG. 26; 366/102
See application file for complete search history.

(56) References Cited

U.S. PATENT DOCUMENTS 2,875,897 A * 3/1959 Booth ......................... 209/169
2,973,095 A * 2/1961 Anderson et al. ............ 209/169
4,844,843 A * 7/1989 Rajendren ..................... 261/30
4,852,474 A * 8/1989 Mahlich et al. ............... 99/293
5,011,631 A * 4/1991 Hwang ......................... 261/30
5,066,134 A * 11/1991 Ohbori et al. ............... 366/102
5,330,266 A * 7/1994 Stubaus ...................... 366/101
5,638,740 A * 6/1997 Cai ............................. 99/295
6,158,328 A * 12/2000 Cai ............................. 99/293
6,740,345 B2 * 5/2004 Cai ............................. 426/77
2005/0029685 A1 * 2/2005 Zhao .......................... 261/87

FOREIGN PATENT DOCUMENTS

DE        100 50 719 A1    10/2000
WO       WO90/10411        9/1990

* cited by examiner

*Primary Examiner*—Scott Bushey
(74) *Attorney, Agent, or Firm*—Venable LLP; Robert Kinberg; Ryan M. Flandro

(57) ABSTRACT

A device for foaming a liquid includes a casing with a turbine arranged inside the casing. A shaft connects an agitator with the turbine. An air supply nozzle is coupled to the casing and a tube is coupled to the casing for conducting a steam supply to drive the turbine. A pipe is connected between the agitator and the turbine to introduce a steam-air mixture to a region of the agitator. The steam-air mixture is whirled together with the liquid when the agitator is immersed in the liquid.

13 Claims, 5 Drawing Sheets

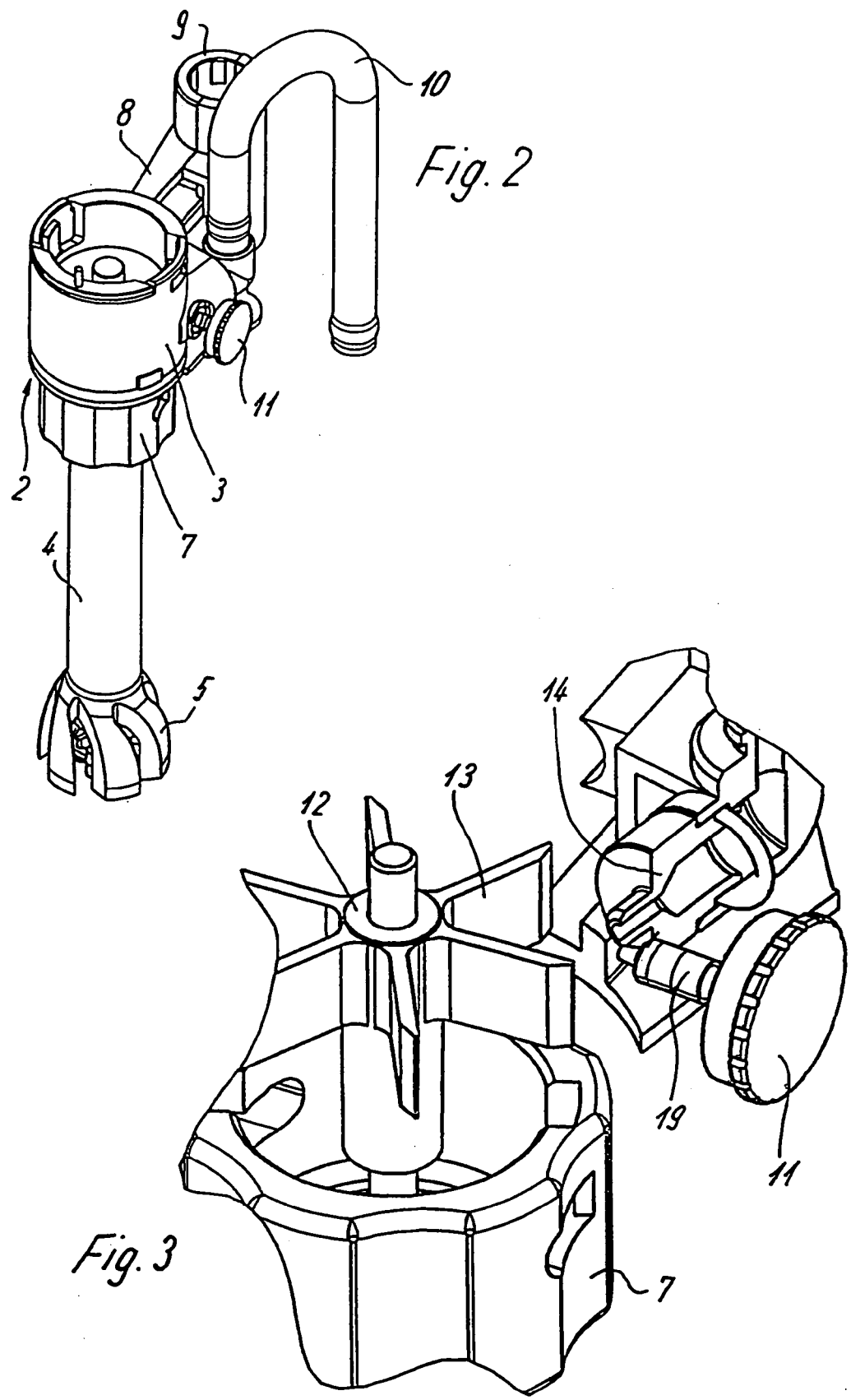

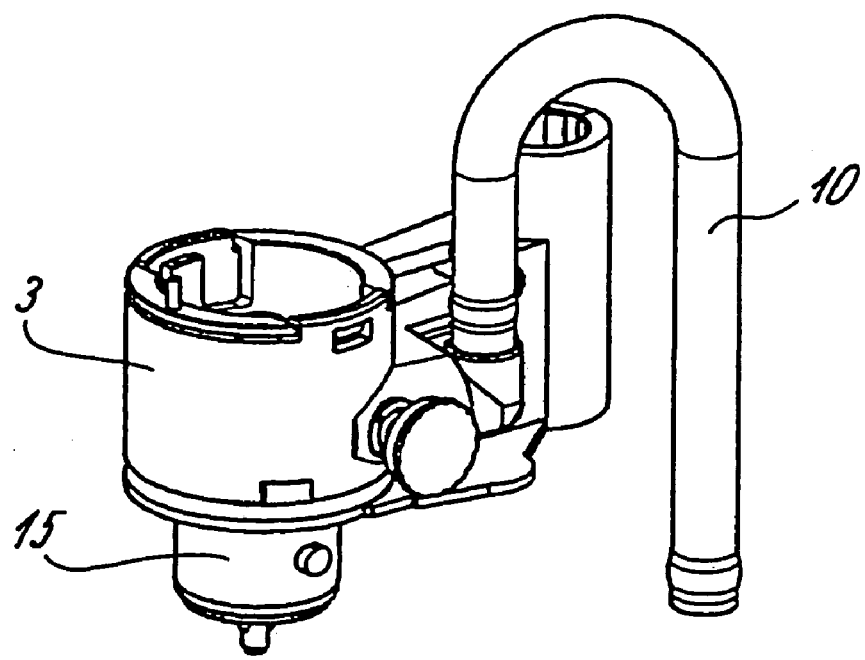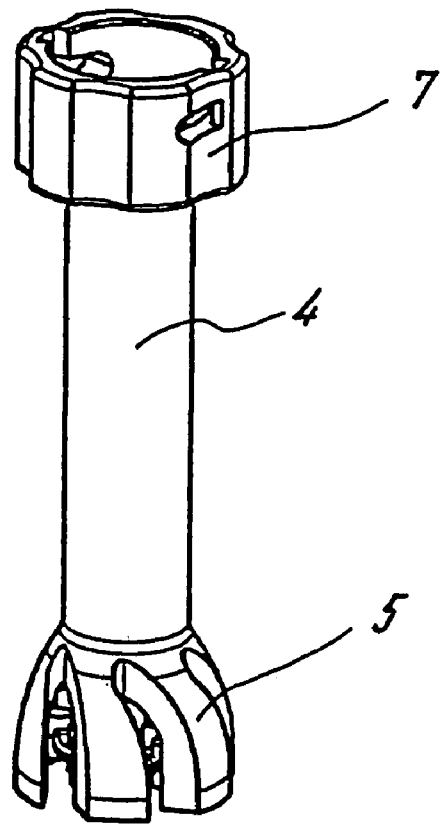
Fig. 4

DEVICE FOR FOAMING A LIQUID

CROSS-REFERENCE TO RELATED APPLICATION

This application claims the priority of German Patent Application No. 10 2004 024 721.8, filed on May 19, 2004, the subject matter of which is incorporated herein by reference. The disclosure of all U.S. patents and patent applications mentioned below are also incorporated herein by reference.

BACKGROUND OF THE INVENTION

The present invention relates to a device for foaming a liquid, in particular milk, the device comprising a steam supply unit for operating a turbine positioned inside a casing, as well as a device for supplying air, wherein the turbine is connected by a shaft to an agitator for whirling the liquid.

International Patent Application Publication No. WO 90/10411 discloses a device for foaming and simultaneously heating a liquid such as milk, wherein a turbine wheel driven by hot steam functions to suction the liquid to be foamed into an emulsifying cage where the liquid is whirled. The disadvantage of this device is that the liquid to be foamed is in direct contact with the turbine wheel, thus making it possible for contaminants to be deposited which are the difficult to remove. In addition, the turbine wheel is designed to simultaneously function as an agitator, which is a disadvantage since the turbine rotation is not optimally directed toward the generating of foam.

A device for generating milk foam is disclosed in German Patent document DE 100 50 719, wherein a turbine wheel attached to a pipe operates an agitator arranged at the end of the pipe. The pipe is furthermore provided with air-intake openings and slots for suctioning in the milk. The milk thus enters a region on the inside of the pipe and is then transported to the agitator where it is foamed. As a result, contaminants that are hard to remove can be deposited on the inside of the pipe.

SUMMARY OF THE INVENTION

It is an object of the present invention to create a device for foaming a liquid which has a simple design, permits an effective foaming, and is easy to clean.

The above and other objects are accomplished according to the invention by the provision of a device for foaming a liquid, comprising: a casing; a turbine arranged inside the casing; an agitator; a shaft connecting the agitator with the turbine; an air supply nozzle coupled to the casing; a tube coupled to the casing for conducting a steam supply to drive the turbine; and a pipe connected between the agitator and the turbine to introduce a steam-air mixture to a region of the agitator, wherein the steam-air mixture is whirled together with the liquid when the agitator is immersed in the liquid.

Thus, according to the invention, a steam-air mixture is fed via a pipe into the region of the agitator and is then whirled together with the liquid. As a result, the agitator can be adapted optimally to the foaming requirements and, in particular, can ensure a sufficient stirring up of the liquid. The arrangement can furthermore be operated hygienically since only the steam-air mixture is supplied via the pipe, and the liquid to be foamed for the most part cannot deposit contaminants in this region. Further, at least the regions coming into contact with the liquid to be foamed are easily accessible for the purpose of cleaning.

According to one preferred embodiment of the invention, a ring-shaped cover containing several flow-through openings is provided in the area surrounding the agitator. On the one hand, this cover functions to calm down the flow that is whirled up by the agitator while, on the other hand, the cover protects the agitator against damage when it is submerged into a container. The cover is preferably provided with several webs which form flow surfaces that are inclined relative to a radial direction of the rotational axis for the agitator. As a result, the flow can be calmed particularly well, wherein these webs have the additional advantage of being easy to clean and having an open structure.

It is preferable if the agitator together with the shaft can be removed from a section of the turbine casing for the purpose of cleaning wherein the individual components can be dismantled further to realize a thorough cleaning at specific intervals. The ability to remove the agitator has the advantage that for the most part the agitator is submerged pointing downward into a container. By pulling off the agitator, it is easily accessible from below and can be cleaned with a brush together with the cover.

For an easy handling of the device, the unit consisting of casing, turbine, agitator, and pipe can be moved vertically up and down, wherein other components can also be displaced along with this unit. These components are not explicitly mentioned herein and may include, for example, a connection for the steam feed-in, valves, seals, and the like. This unit is preferably positioned pivoting on a holder, so that the agitator can be submerged for use into a container and can subsequently be removed again in upward direction and pivoted to the side to permit the removal of the container.

If the air intake is arranged upstream of the turbine, as seen in flow direction, more energy is available for the air transport, wherein the effectiveness of the turbine is influenced only slightly. Furthermore, the air intake can be arranged in a region of the casing which is protected and is thus not subject to the deposit of contaminants.

According to a another embodiment of the invention, the amount of air which can be added is adjustable, wherein the type of foam obtained can be varied by changing the amount of air. For example, foam that is more delicate but lasts longer is generated when a lower amount of air is supplied, wherein the air can be suctioned in using a venturi effect.

BRIEF DESCRIPTION OF THE DRAWINGS

These and other features and advantages of the invention will be further understood from the following exemplary embodiment and reference to the accompanying drawings.

FIG. 2 shows a detailed view of the device shown in FIG. 1.

FIG. 3 shows a perspective detailed view of the turbine region for the device shown in FIG. 1.

FIG. 4 shows a perspective view of the device shown in FIG. 1, with the agitator removed.

DETAILED DESCRIPTION OF THE INVENTION

Figure 1:
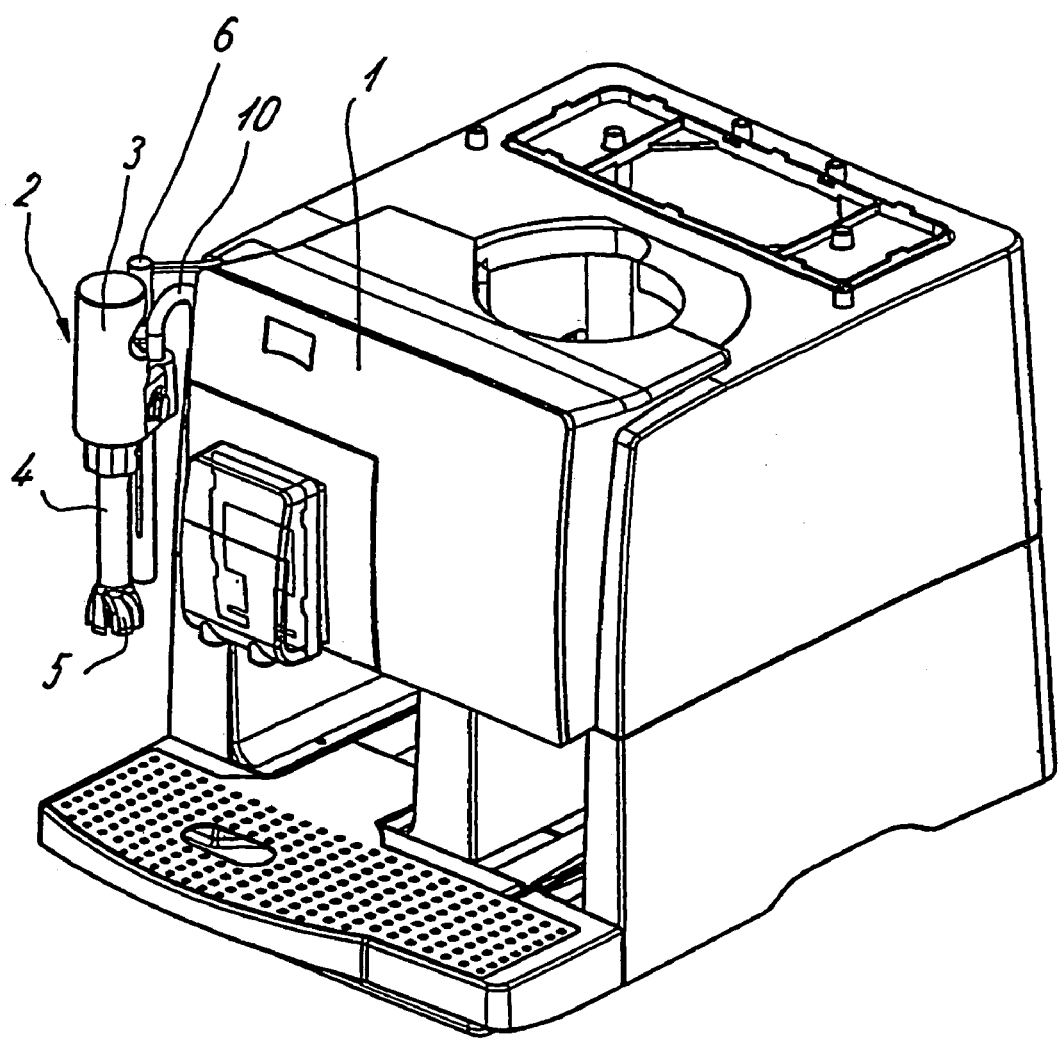
FIG. 1 shows a perspective view of an automatic coffee maker provided with a device according to the invention for foaming a liquid.

Referring to FIG. 1, there is shown an automatic coffee maker 1 with a box-shaped design which includes a device, known per se, for grinding beans and brewing coffee. A device 2 for foaming a liquid, in particular milk, is arranged to one side of the automatic coffee maker 1. The device 2 comprises a casing 3, provided with a pipe 4 on the underside, wherein a bell-shaped, expanding cover 5 is formed onto the pipe end. The casing 3 is positioned by means of a holder and a rod 6 on the automatic coffee maker 1, such that the device can be displaced in height and can be pivoted.

FIG. 2 shows that a lower region of casing 3 contains a casing ring 7 which can be attached to and/or detached from the casing 3 by a bayonet fastener. An extension arm 8 is formed onto the casing 3 and is provided with a sleeve 9 on its end, wherein sleeve 9 is guided along the rod 6. In the process, the sleeve 9 can be locked in place for different rotational positions along the rod 6 to ensure that the device 3 remains in the desired pivoted position. For the height adjustment, the sleeve 9 can be clamped in place along the rod 6.

The casing 3 is furthermore provided with a steam supply via a flexible tube 10, wherein this the flexible tube 10 can be moved up and down in height together with the casing 3.

FIG. 3 shows an enlarged view of the steam supply region at the transition to the casing 3. A nozzle 14 with tapered cross-section is connected to flexible tube 10 to receive the steam supply wherein the tapered cross section ensures that the steam flowing through is accelerated. An air nozzle 19 for the intake of environmental air is installed in the adjacent channel region with tapered cross section.

The amount of air can be adjusted via a rotary knob 11, so that a predetermined steam-air mixture enters the casing 3. A turbine 12 with blades 13 that project in a radial direction is positioned inside the casing 3 and/or the casing ring 7 so that the turbine 12 can rotate. From the turbine 12, the steam-air mixture then flows downward through the pipe 4.

The casing ring 7 can be removed from the casing 3, as shown in FIG. 4, wherein a connecting piece 15 that is formed onto the casing 3 projects downward and can interlock with the casing ring 7 in the manner of a bayonet fastener.

The structural component made of plastic and consisting of casing ring 7, pipe 4, cover 5, as well as all the parts arranged therein, can be cleaned easily.

Figure 5:
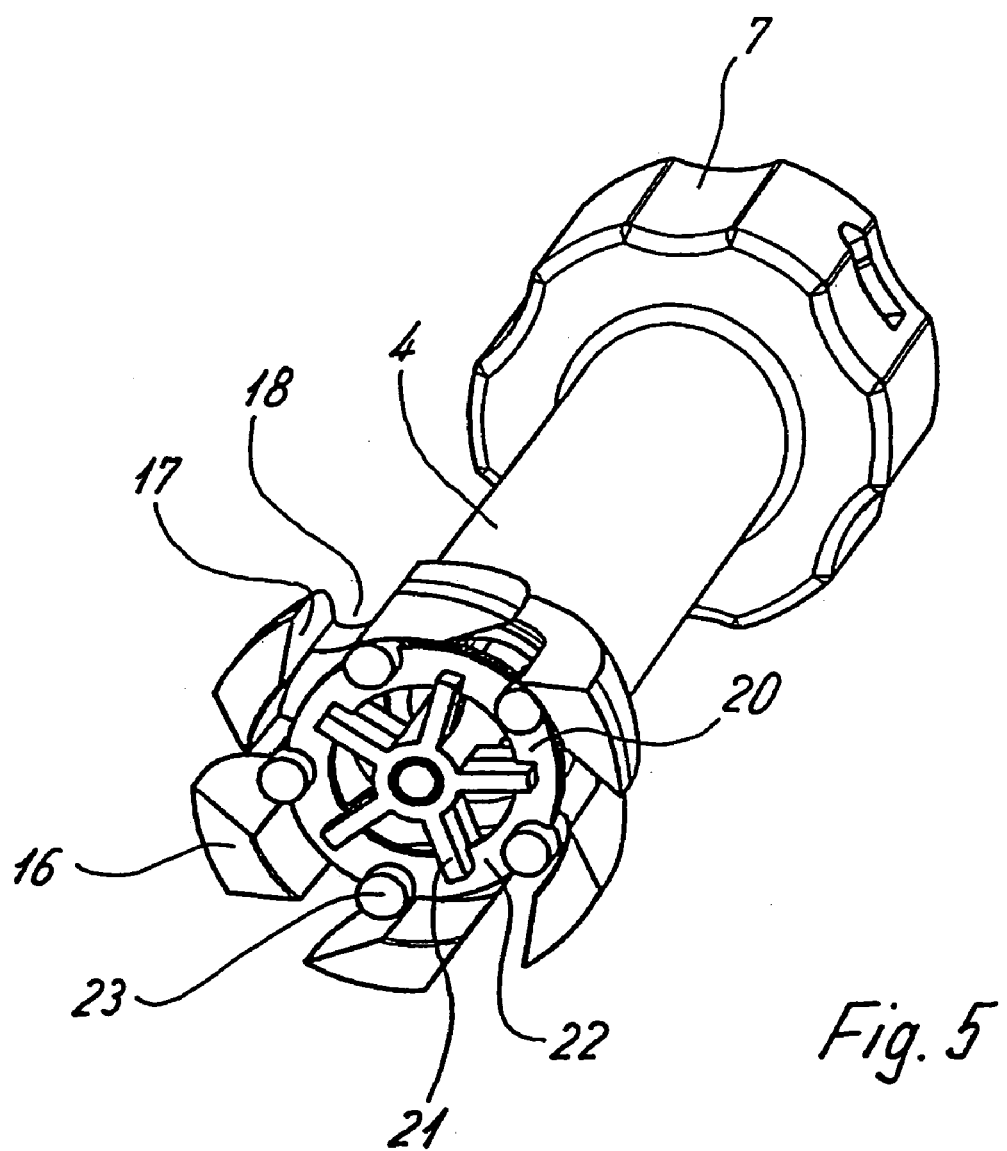
FIG. 5 shows a perspective detailed view of the agitator, seen at a slant from below.

FIG. 5 shows a view from below of the cover 5 with an agitator 20. The agitator 20 has a ring-shaped design and is provided with blades 21 that project radially outward from a central rotational axis. The ring 22 furthermore comprises formed-on projections 23 which point toward the outside and ensure a whirling of the fluid.

The cover 5, which is arranged around the agitator 20, extends past the agitator 20 and prevents any contact between the agitator 20 and other structural components. The cover 5 comprises a closed section that is facing the pipe 4, as well as webs 16 that project downward and are designed with flow-through openings 18 in-between. The webs 16 are slanted, relative to a radial direction of the axis of rotation for the agitator 20, and are thus provided with flow-guiding surfaces 17 for slowing down the flow.

Figure 6:
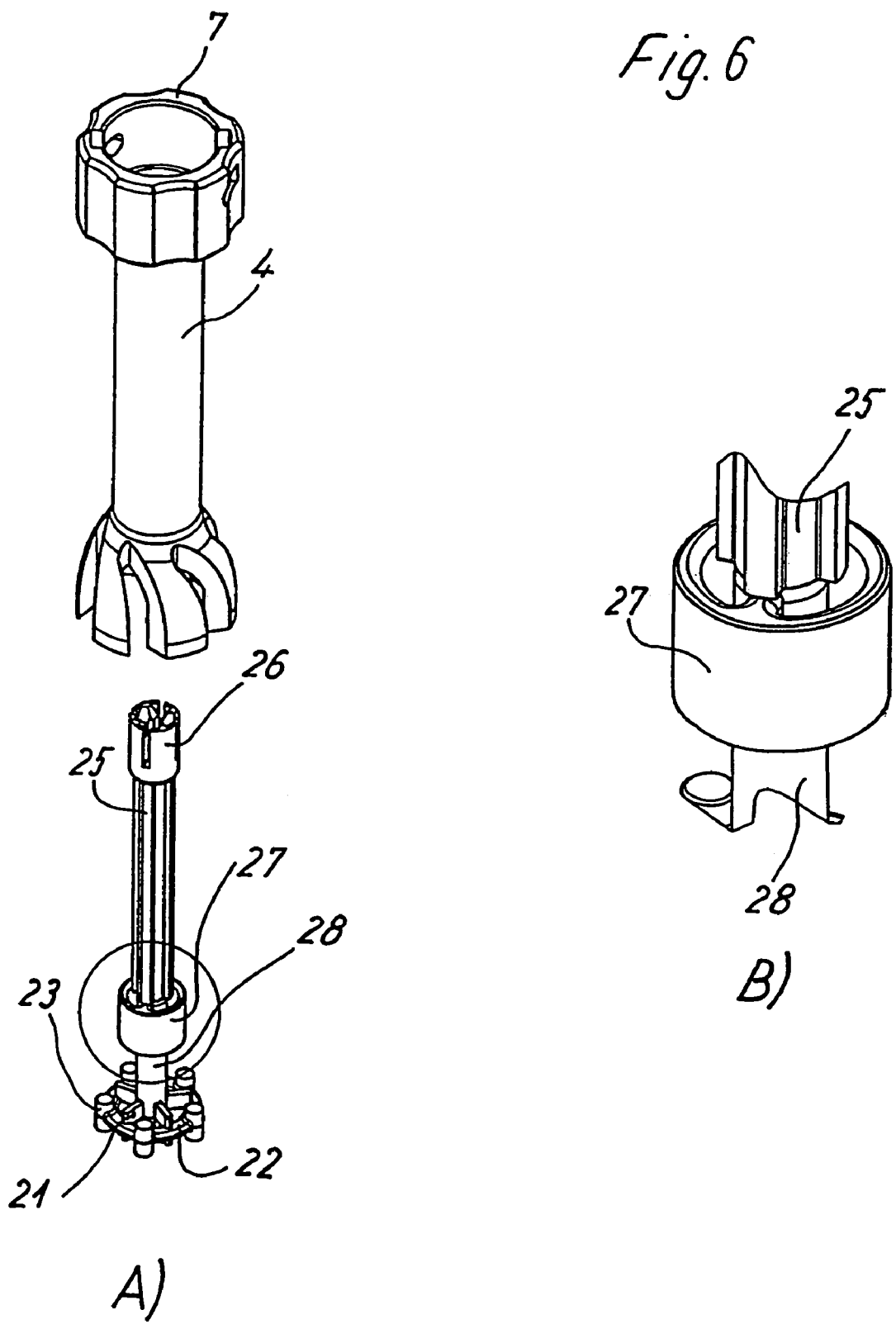
FIG. 6A shows a perspective, enlarged view of the agitator and the pipe for the device shown in FIG. 1.
FIG. 6B shows a detailed view of the shaft for the agitator shown in FIG. 6A.

As shown in FIGS. 6A and 6B, the arrangement can be dismantled further. In particular, it is possible to remove a shaft 25 with head section 26 from its connection to the turbine 12 and pull it out of the pipe 4 for cleaning purposes. An elastic bearing ring 27 is secured to the shaft 25, wherein this ring is essentially installed form-locking inside the pipe 4 for a radial support of the shaft 25. A ring-shaped projection can be provided inside the pipe 4 for axially locking in place the bearing ring 27. At a lower end, the shaft 25 is provided with a connecting part 28 to which the agitator 20 is attached. These components can also be connected, if necessary, via detachable clamping and/or plug-in connections.

For operating the device, the cover 5 is submerged into a liquid, in particular milk, and the agitator 20 is driven by means of the steam supplied via tube 10. A rotatable knob 11 is used to adjust the amount of air that is required, wherein the steam-air mixture enters the liquid in the region of agitator 20 and whirls up the liquid. The cover 5 protects the surrounding area against splatters. Following use, the device is moved upward and is pivoted to the side for removing the container.

Other agitator designs or geometries for whirling the liquid can also be used in place of the geometry for the agitator 20, shown herein. Furthermore, the shape of the cover 5 in the form of a sleeve with webs extending downward and the number of such webs can also be varied.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A device for foaming a liquid, comprising:
a casing;
a turbine arranged inside the casing;
an agitator;
a shaft connecting the agitator with the turbine;
an air supply nozzle coupled to the casing;
a tube coupled to the casing for conducting a steam supply to drive the turbine;
a pipe connected between the agitator and the turbine to introduce a steam-air mixture to a region of the agitator, wherein the steam-air mixture is whirled together with the liquid when the agitator is immersed in the liquid; and
a holder, wherein the casing, turbine, agitator, and pipe comprise a unit that is positioned on the holder such that the unit is pivotable.

2. The device according to claim 1, further including a ring-shaped cover with a plurality of flow-through openings located around the agitator.

3. The device according to claim 2, wherein the cover includes a plurality of webs that define slanted flow-guidance surface relative to a radial direction for the rotational axis of the agitator.

4. The device according to claim 1, wherein the agitator and the shaft are together removable from a portion of the casing for the turbine.

5. The device according to claim 1, wherein the casing, turbine, agitator, and pipe comprise a unit that is vertically displaceable.

6. The device according to claim 1, wherein the air supply nozzle is arranged upstream of the turbine as seen in a flow direction.

7. The device according to claim 1, wherein the air supply nozzle is adjustable to adjust an amount of air required for stirring up the mixture.

8. A device for foaming a liquid, comprising:
- a casing;
- a turbine arranged inside the casing;
- an agitator;
- a shaft connecting the agitator with the turbine;
- an air supply nozzle coupled to the casing, wherein the air supply nozzle is arranged upstream of the turbine as seen in a flow direction;
- a tube coupled to the casing for conducting a steam supply to drive the turbine; and
- a pipe connected between the agitator and the turbine to introduce a steam-air mixture to a region of the agitator, wherein the steam-air mixture is whirled together with the liquid when the agitator is immersed in the liquid.

9. The device according to claim 8, further including a ring-shaped cover with a plurality of flow-through openings located around the agitator.

10. The device according to claim 9, wherein the cover includes a plurality of webs that define slanted flow-guidance surface relative to a radial direction for the rotational axis of the agitator.

11. The device according to claim 8, wherein the agitator and the shaft are together removable from a portion of the casing for the turbine.

12. The device according to claim 8, wherein the casing, turbine, agitator, and pipe comprise a unit that is vertically displaceable.

13. The device according to claim 8, wherein the air supply nozzle is adjustable to adjust an amount of air required for stirring up the mixture.

* * * * *